June 21, 1927.
G. F. ECKART
1,633,243
FLEXIBLE COUPLING
Filed Oct. 8, 1925
2 Sheets-Sheet 1
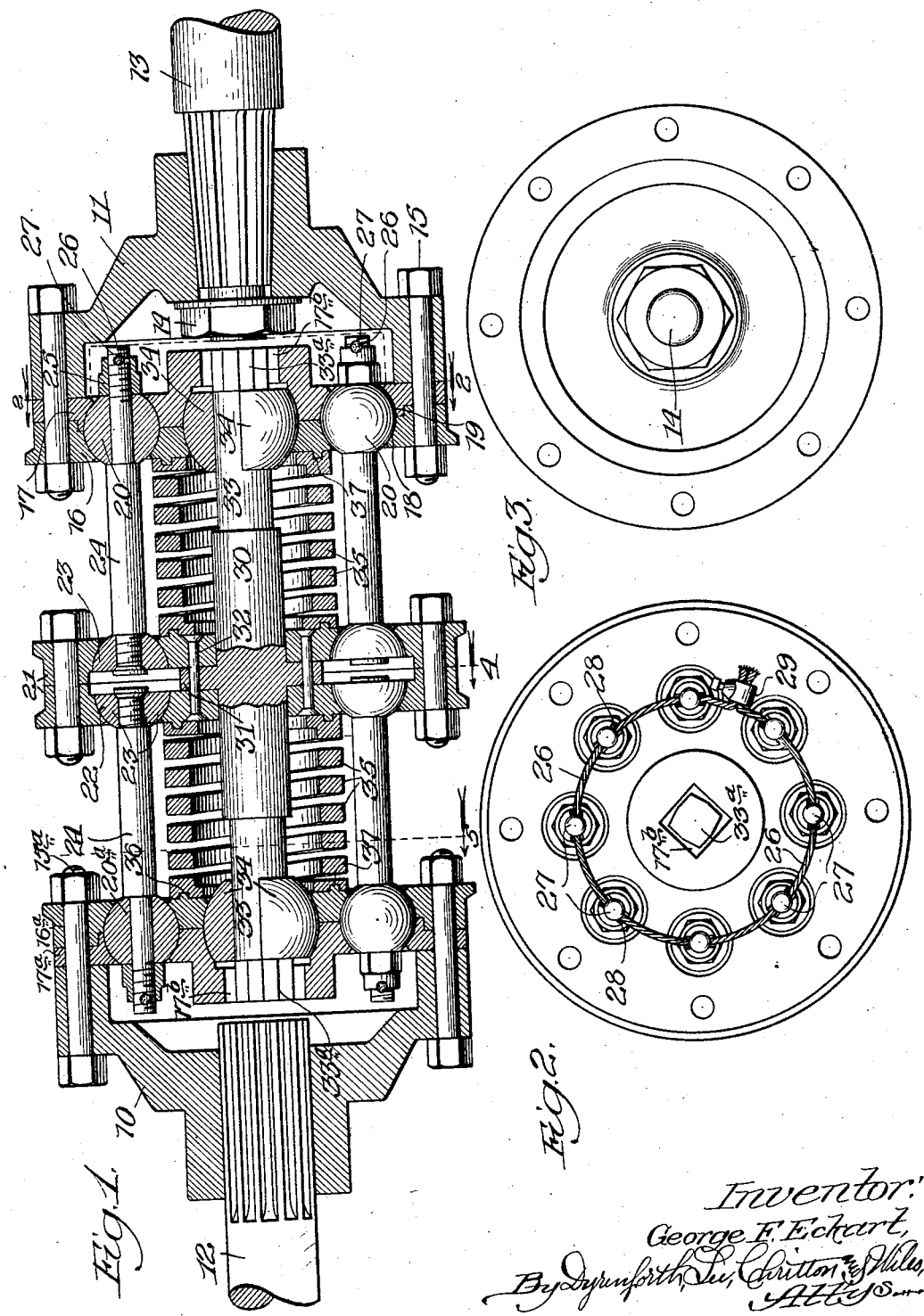
Inventor:
George F. Eckart, June 21, 1927.  G. F. ECKART  1,633,243

FLEXIBLE COUPLING

Filed Oct. 8, 1925  2 Sheets-Sheet 2

Inventor:
George F. Eckart,
By Dyrenforth, Lee, Chritton & Wiles,
Attys.

Patented June 21, 1927.

1,633,243

UNITED STATES PATENT OFFICE.

GEORGE F. ECKART, OF SOUTH BEND, INDIANA, ASSIGNOR TO GEORGE A. CHRITTON, TRUSTEE.

FLEXIBLE COUPLING.

Application filed October 8, 1925. Serial No. 61,235.

This invention relates to flexible couplings and the like and is particularly adapted to be used on propeller shafts of motor vehicles and the like.

This invention is fully described in the following specification and shown in the accompanying drawings, in which:

Figure 1 is a longitudinal section through the coupling;

Fig. 2 is a view on the broken line 2—2 of Fig. 1 looking in the direction of the arrows;

Fig. 3 is a view looking in the reverse direction;

Figure 4:
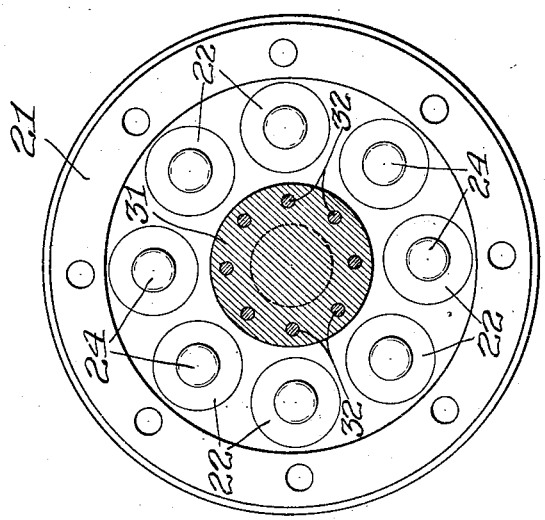
Figure 5:
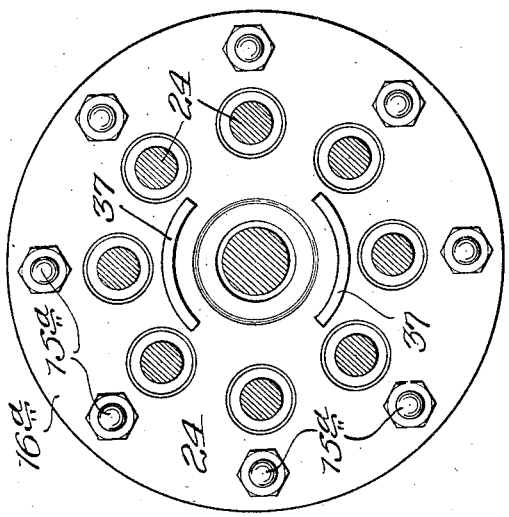
Figure 6:
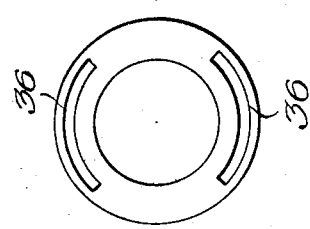

Figs. 4 and 5 are partial sections on the lines 4 and 5 respectively of Fig. 1; and Fig. 6 is an end elevation of the compression spring.

The embodiment illustrated comprises end yokes 10 and 11, the former being splined to receive the splined end of a shaft 12, so as to be slidable thereon, the latter being keyed to a shaft 13 and held thereon by means of a nut 14. Bolts 15 pass through the yoke 11 and serve to secure thereto the flange members 16 and 17. These have facing semi-spherical recesses 18 and 19, in which are rotatably mounted balls 20.

The yoke 10 likewise carries flange members 16ª and 17ª which are secured thereto by means of bolts 15ª and in which are rotatably mounted balls 20ª. Between the members 16 and 16ª is located a pair of contiguous flange members 21 which are preferably similar to the flange members 16 and 16ª and which have semi-spherical recesses 22 in which may be rotatably mounted semi-spherical balls 23. Each of the balls 23 lies opposite one of the balls 20 or 20ª and is connected thereto by means of a radius rod 24, the ends of these rods being reduced so as to pass through the balls 20, 20ª and 23. They are preferably threaded so as to be screwed into balls 23 and if desired riveted over after being screwed therein so as to securely lock the balls 23 on the rods 24. The ends of the pins 24 are reduced so as to pass through the balls 20 and 20ª and are screw threaded to receive nuts 25. To insure that these nuts will not become unscrewed and, at the same time provide a certain amount of flexibility and play between the rods 24 and the flange members 16 and 17, I have provided a flexible metal rope 26 which is adapted to pass through openings in the ends of the reduced extensions 27 and through slots 28 in the ends of the nuts 25. The ends of the rope 26 are brought together as shown in Fig. 2 and are secured by means of a convenient clamp 29.

The central shaft 30 passes through the center of the central flanges 21 and has a flange 31 which lies between the flanges 21 and is secured thereto by means of rivets 32. The end of this shaft preferably has reduced ends 33 which are slidable in balls 34, the latter being suitably mounted to turn in recesses in the flange members 16 and 17.

Compression springs 35 tend to force the flange members 16 and 21 apart so as to place the radius rods 24 in tension. The springs 35 are not only compressed, but are given a partial twist and for this purpose are provided with depressions 36 in their ends as shown in Fig. 6 which fit over lugs 37 on the flange members 16 and 16ª, the depressions 36 and lugs 37 being preferably arcuate and concentric with the axis of the shaft 30.

Thus it will be seen that any sudden shock received by the propeller shaft 12 such as is constantly occurring due to the unevenness in the road, will be taken up by the springs 35 so that only a small portion of it will be transmitted through the driving shaft 13 to the engine. When this occurs, the flange member 16ª, and to a less degree the flange members 21, will be turned with respect to the flange member 16, while the radius rods 24 move to accommodate themselves to this temporary shift. As soon as the sudden strain is passed, the spring 35 forces these parts back to their normal position. During this movement however the radius rods 24 swing slightly thereby drawing the members 16ª, 21 and 16 toward each other, compressing the springs 35 and sliding the yoke member 10 along the splined end of the propeller shaft 12.

The outer ends of the shaft 30 are flattened as shown at 33ª in Fig. 2 and these pass into the openings 17ᵇ in the members 17 and 17ª so as to form a positive stop for the relative rotational movement for the member 17ª with respect to the member 17. When this point has been reached the faces on the end of the member 33 engage the sides of the opening 17ᵇ thereby causing the member 17 to drive the shaft 30 and through this the member 17ª in a positive manner.

The use of two ball and socket members 34 enables the flexible coupling to adjust itself to varying degrees of equalizer differences between the shafts 12 and 13 so that by this means as well as by the double arrangement of springs and radius rods a very flexible coupling is provided.

While I have shown and described but a single embodiment of this invention, it is to be understood that it is capable of many modifications. Changes therefore in the construction and arrangement may be made which do not depart from the spirit and scope of the invention as disclosed in the appended claims.

I claim:

1. In a flexible coupling, end and central flanges, a shaft secured to the central flange and flexibly connected to the end flanges, a series of tension members spaced about said shaft and flexibly connecting said flanges, and springs tending to force said flanges apart.

2. In a flexible coupling, end and central flanges, a shaft secured to the central flange and slidable in spherical members movably mounted in the end flanges, a series of tension members spaced about said shaft and flexibly connecting said flanges, and springs tending to force said flanges apart.

3. In a flexible coupling, end and central flanges, a shaft secured to the central flange and flexibly connected to the end flanges, a series of tension members spaced about said shaft and having ball and socket connections in said flanges, and springs tending to force said flanges apart.

4. In a flexible coupling, end and central flanges, a shaft secured to the central flange and slidable in spherical members movably mounted in the end flanges, a series of tension members spaced about said shaft and having ball and socket connections in said flanges, and springs tending to force said flanges apart.

In testimony whereof I have hereunto set my hand this 14th day of September, 1925.

GEORGE F. ECKART.